(12) United States Patent
Ichikawa (10) Patent No.: US 11,412,104 B2
(45) Date of Patent: Aug. 9, 2022

(54) PROXIMITY DETECTION DEVICE

(71) Applicant: ALPINE ELECTRONICS, INC., Tokyo (JP)

(72) Inventor: Teiichi Ichikawa, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 48 days.

(21) Appl. No.: 16/951,072

(22) Filed: Nov. 18, 2020

(65) Prior Publication Data

US 2021/0195050 A1    Jun. 24, 2021

(30) Foreign Application Priority Data

Dec. 19, 2019  (JP) .............................. JP2019-228758

(51) Int. Cl.
   *H04N 1/028*    (2006.01)
   *G01S 17/89*    (2020.01)
   *G01S 17/931*   (2020.01)

(52) U.S. Cl.
   CPC ......... *H04N 1/02865* (2013.01); *G01S 17/89* (2013.01); *G01S 17/931* (2020.01)

(58) Field of Classification Search
   CPC ........ B60K 2370/141; B60K 2370/332; B60K 2370/48; B60K 35/00; B60K 37/06; G01S 17/89; G01S 17/931; G06F 2203/04101; G06F 2203/04108; G06F 3/0421; G06F 3/0428; G06F 3/013; G06F 3/0412; G06F 3/0445; G06F 3/0448; G06F 3/04886; G06F 2203/04103; G06F 2203/04113; G06F 3/04164; G06F 3/04166; G06F 3/0446; H04N 1/02865; H04N 2007/145; H04N 21/4223; H04N 21/44218; H04N 7/142; H04N 7/144; H04N 7/147; H04N 7/183; G06K 19/0723; G06K 7/10396; G06K 7/1417; G06V 40/1306; G06V 40/1329; G08C 17/02; G08C 2201/32;
(Continued)

(56) References Cited

U.S. PATENT DOCUMENTS 9,218,076 B2 * 12/2015  Nagahara ................ G06F 3/042
10,678,362 B2 *  6/2020  Ishizaki ................ G06F 3/0412
(Continued)

FOREIGN PATENT DOCUMENTS

JP    2009-216888    9/2009
JP    2010-191288    9/2010
JP    2013-218549   10/2013

OTHER PUBLICATIONS

Extended European Search Report for 20211448.4 dated May 19, 2021, 9 pgs.

*Primary Examiner* — Negussie Worku
(74) *Attorney, Agent, or Firm* — Crowell & Moring LLP (57) ABSTRACT

A proximity detection device detects the proximity of an object using a light emitting element and a light receiving element that receives reflected light of irradiation light from the light emitting element reflected by the object. A mirror is provided near the light emitting element to reflect part of the irradiation light emitted from the light emitting element toward an area at which the irradiation light from the light emitting element does not sufficiently arrive, and a mirror is provided near the light receiving element to enable reception of the reflected light from the light emitting element in a wide range.

21 Claims, 10 Drawing Sheets

(58) Field of Classification Search
CPC ............ G08C 2201/40; G08C 2201/91; G08C 2201/93; H04L 65/1059; H04L 65/1086; H04L 65/60; H04M 1/724; Y02D 30/70; G02F 1/133354; G02F 1/13338; G02F 1/1339; G02F 1/1341; G02F 1/134309; G02F 1/13439; G02F 1/13452; G02F 1/136286; G02F 1/136295; H01L 27/1244
USPC ........................................................ 358/474
See application file for complete search history.

(56) References Cited

U.S. PATENT DOCUMENTS

| | | | | |
|---|---|---|---|---|
| 2006/0188232 | A1* | 8/2006 | Taira | H04N 5/85 |
| | | | | 386/E5.064 |
| 2007/0063130 | A1* | 3/2007 | Ahn | G06F 3/03547 |
| | | | | 250/221 |
| 2009/0265670 | A1* | 10/2009 | Kim | G06F 3/04883 |
| | | | | 715/863 |
| 2011/0221696 | A1 | 9/2011 | Waeller et al. | |
| 2011/0254811 | A1* | 10/2011 | Lawrence | G06Q 50/12 |
| | | | | 345/175 |
| 2011/0304591 | A1* | 12/2011 | Takahashi | G06F 3/0428 |
| | | | | 250/221 |
| 2013/0155041 | A1* | 6/2013 | Yanai | H04N 21/42202 |
| | | | | 345/207 |
| 2014/0285418 | A1* | 9/2014 | Adachi | G06F 3/04886 |
| | | | | 345/156 |
| 2014/0354567 | A1* | 12/2014 | Park | G09G 5/003 |
| | | | | 345/173 |
| 2015/0237079 | A1* | 8/2015 | Hirata | H04N 7/144 |
| | | | | 348/14.07 |
| 2017/0263113 | A1* | 9/2017 | Tiberi | G06T 7/70 |
| 2017/0308173 | A1* | 10/2017 | Youn | G01V 8/20 |
| 2018/0079362 | A1* | 3/2018 | Miyasaka | B60R 13/0243 |
| 2021/0197725 | A1* | 7/2021 | Imamura | B60R 1/08 |
| 2021/0232259 | A1* | 7/2021 | Ichikawa | G06F 3/0418 |
| 2021/0331706 | A1* | 10/2021 | Kim | G06V 40/28 |
| 2022/0011877 | A1* | 1/2022 | Ichikawa | G06F 3/0308 |

* cited by examiner

PROXIMITY DETECTION DEVICE

RELATED APPLICATION

The present application claims priority to Japanese Patent Application Number 2019-228758, filed Dec. 19, 2019, the entirety of which is hereby incorporated by reference.

BACKGROUND

1. Field of the Invention

The present invention relates to a proximity detection device that detects the presence or absence of the proximity of an object, and more particularly to a proximity detection device associated with an electronic device such as a touch panel display.

2. Description of the Related Art

In recent years, the installation of proximity detection devices on in-vehicle displays is increasing along with the practical application of an input using a touch panel display, a gesture input, and the like. The proximity detection device irradiates an object with infrared light, for example, using an infrared LED that emits the infrared light and a light receiving element such as a photodiode, and receives the reflected light thereof to detect the proximity of the object. For example, an electronic device of JP 2013-218549 A discloses a proximity sensor in which four infrared LEDs and one light receiving element are arranged in a lower part of a display, or two infrared LEDs and one light receiving element are arranged in an upper part of the display and two infrared LEDs and one light receiving element are arranged in the lower part. In addition, display devices of JP 2010-191288 A and JP 2009-216888 A achieve improvement in visibility by providing a proximity sensor in a lower part of a display and changing the emission brightness of a display screen or a content of the display screen when the proximity sensor detects an approach of a user's hand.

Figure 1A:
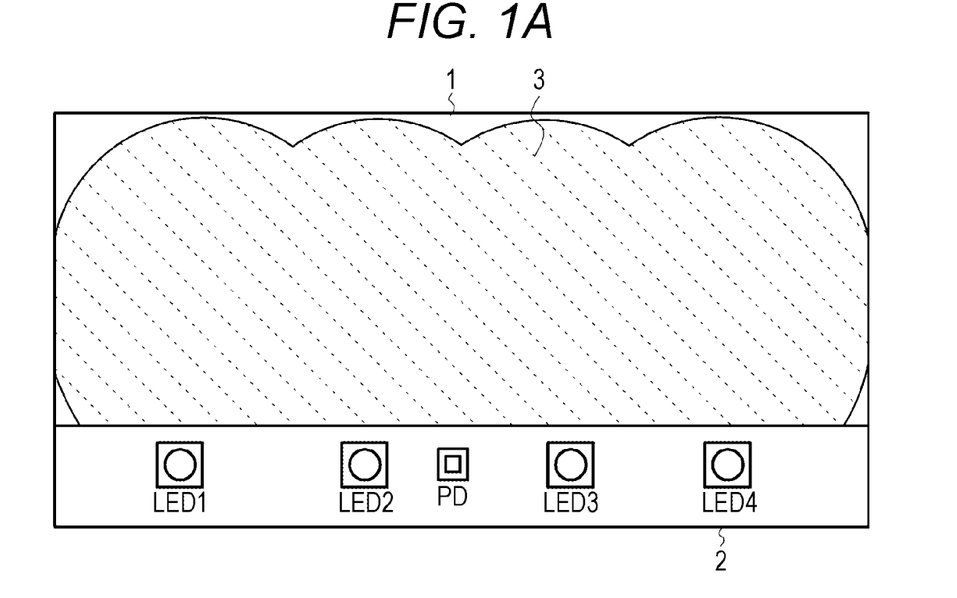
FIG. 1A is a front view of a display.
Figure 1B:
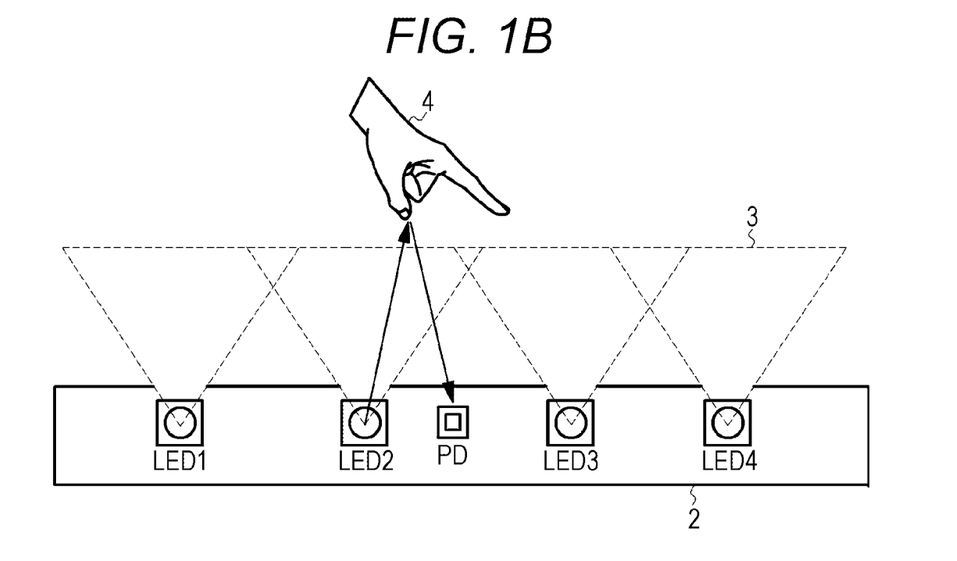
FIG. 1B is a view illustrating a detection example of an operation target.

FIGS. 1A and 1B illustrate examples of a conventional proximity detection device. As illustrated in FIGS. 1A and 1B, an accommodating member 2, which accommodates four LED 1, LED 2, LED 3, and LED 4 that emit infrared rays and a light receiving element PD, is provided in the lower part of the touch panel display 1. The LEDs 1 to 4 are arranged at substantially equal intervals in the horizontal direction, and the light receiving element PD is arranged near the center thereof.

Figure 2A:
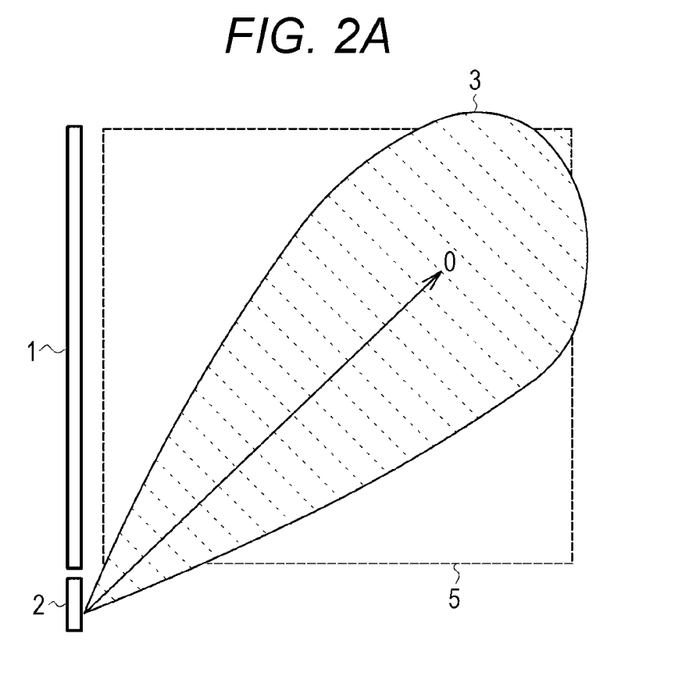
FIG. 2A is a view illustrating a detection area of the conventional proximity detection device.

As illustrated in FIG. 1B, when a user's operation target 4 approaches the display 1, reflected light of irradiation light 3 from the LED 2, reflected by the operation target 4, is received by the light receiving element PD so that an approach of the operation target 4 is detected. As illustrated in FIG. 2A, the LEDs 1 to 4 and the light receiving element PD are arranged in the accommodating member 2 in the lower part of the display 1 to form a detection area 5 on a front surface of the display 1, and thus, it is necessary to set each irradiation direction, that is, each optical axis O of the LEDs 1 to 4, to an oblique direction gradually away from the surface of the display 1.

Figure 2B:
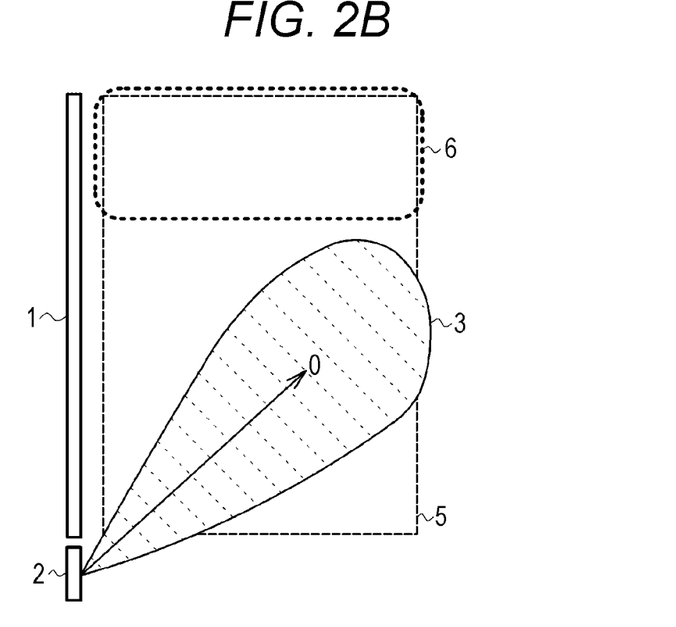
FIG. 2B is a view illustrating generation of an undetectable area when a detection distance is shortened.

The display 1 having such a proximity detection function is generally mounted on a center console in a vehicle, but there is a case where it is necessary to adjust a detection distance to be short such that a driver's operation on steering or a lever is not erroneously detected in an area of the display near a driver's seat. FIG. 2B illustrates an example in which an output of infrared light of the LED is weakened in order to shorten a detection distance for the purpose of preventing the erroneous detection. Since the infrared light is emitted in the oblique direction, an irradiation distance in the height direction is also shortened simultaneously when an irradiation distance in the depth direction is shortened. As a result, an undetectable area (blind spot) 6 where detection is not possible is generated because the light does not reach an upper part of the display. Note that there is a method of increasing a detection threshold of the light receiving element PD in addition to weakening the output of the infrared light of the LED in order to shorten the detection distance (that is, weaken the detection capability), but the principle is the same.

Figure 3A:
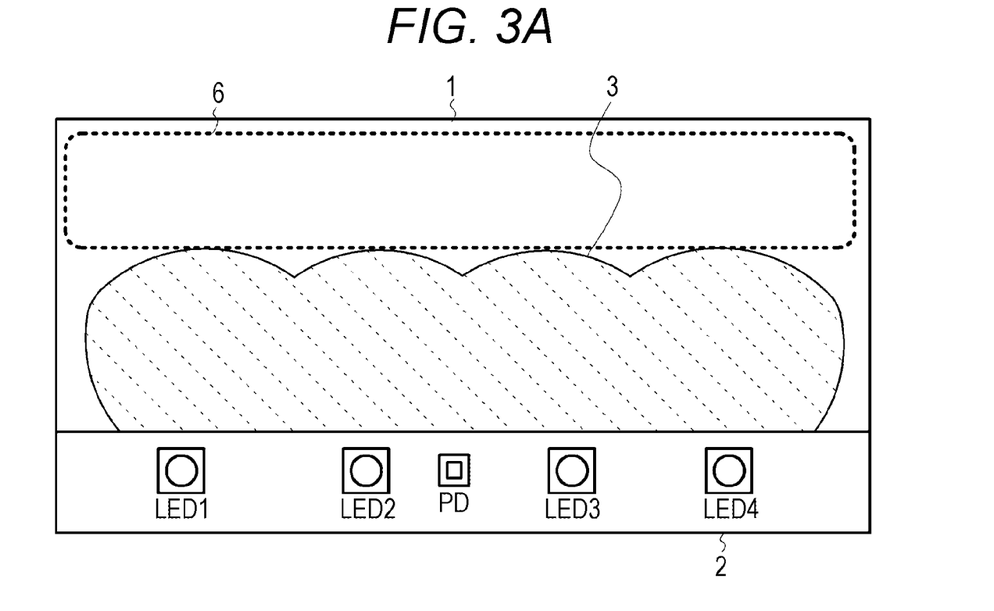
FIG. 3A is a view schematically illustrating generation of the undetectable area when the entire detection distance is shortened.
Figure 3B:
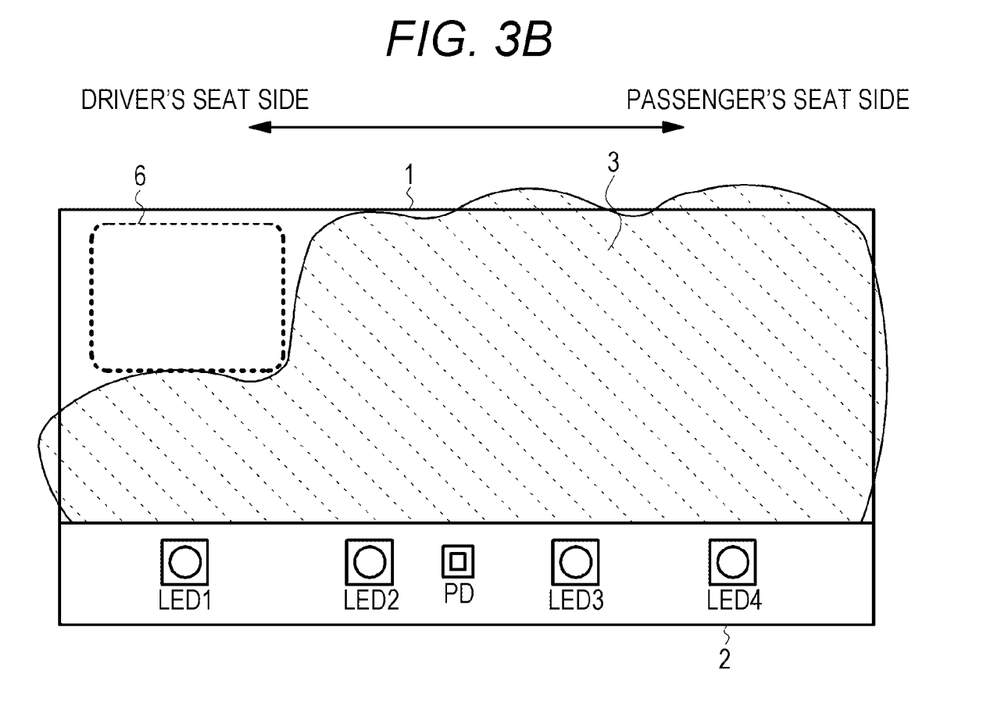
FIG. 3B is a view schematically illustrating generation of the undetectable area when the detection distance on the driver's seat side is shortened.

FIG. 3A is a view schematically illustrating generation of the blind spot (undetectable area 6) where detection is not possible in the upper part of a display screen of the display 1 when each detection distance of the LED 1 to the LED 4 is shortened. In addition, FIG. 3B is a view schematically illustrating generation of the undetectable area 6 in the upper part of the display 1 on the driver's seat side when the detection distance is gradually extended toward a passenger's seat side by shortening the detection distances of only the LED 1 and the LED 2 on the driver's seat side (FIG. 3B is an example of a left-hand steering wheel vehicle).

When such an undetectable area 6 is generated, for example, even if a user's hand approaches to operate an icon displayed in the area 6, such an approach is not detected, and there occurs a problem that it is difficult to input the user's operation.

SUMMARY

The present disclosure aims to provide a proximity detection device capable of solving the above conventional problem and eliminating an undetectable area.

A proximity detection device according to the present disclosure detects the proximity of an object using a light emitting element and a light receiving element that receives reflected light of irradiation light from the light emitting element, reflected by the object, and includes: a first reflective member attached near the light emitting element to reflect part of the irradiation light emitted from the light emitting element toward an area at which the irradiation light from the light emitting element does not sufficiently arrive; and a second reflective member attached near the light receiving element to enable reception of the reflected light from the light emitting element in a wide range.

In an embodiment, the light emitting element is an LED, and the first reflective member is attached such that irradiation light within a certain angle from an optical axis of the light emitting element, which is part of the irradiation light directed to the first reflective member, is reflected. In an embodiment, the second reflective member is attached such that reflected light within a certain angle from an optical axis of the light receiving element, which is part of the reflected light directed to the second reflective member, is received. In an embodiment, the light emitting element and the light receiving element are integrally attached in the periphery of an electronic device. In an embodiment, the electronic device is an in-vehicle display device. In an embodiment, a plurality of the light emitting elements are attached near the electronic device, each optical axis of the plurality of light emitting elements is oblique to the electronic device, a detection distance by a light emitting element on a driver's seat side of the electronic device is shorter than a detection distance by a light emitting element on a passenger's seat side, and the first reflective member is attached at least near the light emitting element on the driver's seat side. In an embodiment, the light emitting element and the light receiving element are attached in a lower part of the electronic device, the light emitting element emits light above the electronic device, and the first reflective member reflects part of the irradiation light of the light emitting element upward. In an embodiment, when a plurality of the light emitting elements are arranged in the left-right direction in the lower part of the electronic device, the first reflective member having a limited width is attached in a lower part of at least one of the light emitting elements. In an embodiment, the light emitting element and the light receiving element are attached to each of left and right sides of the electronic device, and the first and second reflective members are attached near the light emitting element and the light receiving element on at least one of the left and right sides. In an embodiment, the proximity detection device further includes an accommodating member configured to accommodate the light emitting element and the light receiving element. The accommodating member has a first space configured to accommodate the light emitting element and the first reflective member and a second space configured to accommodate the light receiving element and the second reflective member. The light emitting element is attached to a first surface of the first space, and the first reflective member is attached to a second surface which forms a certain angle with the first surface. The light receiving element is attached to a third surface of the second space, and the second reflective member is attached to a fourth surface which forms a certain angle with the third surface. In an embodiment, the second surface and the fourth surface are arranged at approximately equal heights, and the first reflective member is attached at a higher position than the second reflective member when heights of the optical axis of the light emitting element and the optical axis of the light receiving element are approximately equal.

According to the present disclosure, the undetectable area can be eliminated at low cost by providing the first reflective member that reflects part of the irradiation light toward the area at which the irradiation light from the light emitting element does not sufficiently arrive. Further, the undetectable area can be eliminated at low cost by providing the second reflective member so as to enable the reception of the reflected light from the light emitting element in the wide range.

BRIEF DESCRIPTION OF THE DRAWINGS

FIGS. 1A and 1B illustrate examples of a conventional proximity detection device.

FIGS. 5A to 5C are views illustrating the role of an LED mirror according to an embodiment of the present invention.

DETAILED DESCRIPTION OF THE PREFERRED EMBODIMENTS

Next, embodiments of the present invention will be described. In one aspect, a proximity detection device of the present invention includes a light emitting element and a light receiving element that receives reflected light from an object irradiated with light from the light emitting element, and optically detects the presence or absence of the proximity of the object. The light emitting element is, for example, a directional light emitting diode or laser diode, and the light receiving element is a photodiode, a phototransistor, or the like. One or a plurality of light emitting elements and one or a plurality of light receiving elements are integrally attached to the periphery of an electronic device or the like, and the proximity of a user's operation target to the electronic device is detected. When the proximity of the user's operation target is detected, the electronic device performs an operation in response thereto. The electronic device to which the proximity detection device is attached is not particularly limited, and is, for example, an electronic device such as a display in which the proximity of the user's operation target is used as a user input.

Embodiments

Next, a proximity detection device according to an embodiment of the present invention will be described. The proximity detection device of the present embodiment is configured by arranging an LED that emits infrared light and a light receiving element that receives the infrared light at a lower part of a touch panel display. The touch panel display detects the proximity of a user's operation target (for example, a finger) and performs display control (for example, display of a menu screen or display of the next screen) in response to this detection.

When the touch panel display is mounted on a center console in a car, there is a case where it is required to shorten a detection distance on a driver's seat side for the purpose of preventing erroneous detection of a driving operation by a driver. When the detection distance is shortened, an undetectable area (blind spot) is generated in an upper part of the display as illustrated in FIGS. 2B to 3B. In the present embodiment, in order to suppress the generation of such an undetectable area, a mirror is arranged on a lower front side of the LED to reflect part of the light emitted from the LED to an area that is likely to form the undetectable area in the upper part of the display, and at the same time, a mirror is also arranged on the lower front side of the light receiving element such that the reflected light from the user's operation target can be received more effectively in a wide range.

Figure 4A:
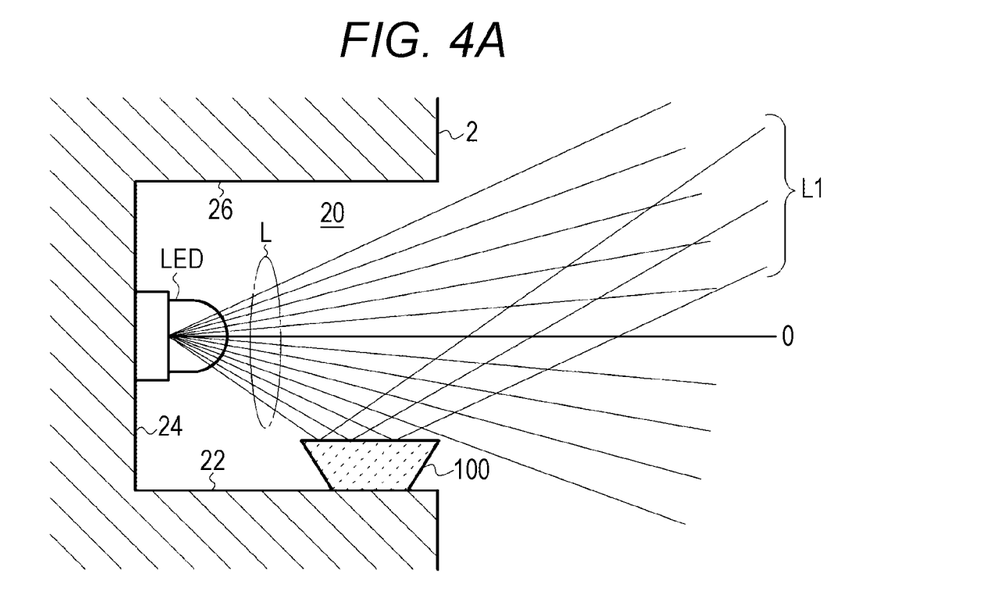
FIGS. 4A and 4B are schematic cross-sectional views illustrating a configuration of a light emitting unit of the proximity detection device according to the embodiment of the present invention.

FIGS. 4A and 4B illustrate schematic cross-sectional views of the light emitting unit including the LED of the present embodiment. As illustrated in FIG. 4A, a recess 20 configured to accommodate an LED or the like is formed in an accommodating member 2 integrally attached to the lower part of a display 1. The recess 20 is, for example, rectangular shape and has a bottom surface 22, a side surface 24 adjacent to the bottom surface 22, and an upper surface 26 adjacent to the side surface 24. An LED is attached to the side surface 24 via a circuit board (not illustrated) or the like. The LED emits infrared light L from an open surface of the recess 20. Note that an optical axis O of the LED is illustrated horizontally here in order to facilitate understanding of the description, but, in practice, the optical axis O is set to an oblique direction with respect to a flat surface of the display (display screen) and a detection area is formed in front of the display screen of the display as illustrated in FIG. 2A. In addition, the open surface of the recess 20 is covered with a cover that transmits infrared light.

A mirror 100 configured to reflect part of irradiation light L of the LED is attached to the bottom surface 22 of the recess 20. The mirror 100 is, for example, a flat plate mirror. The mirror 100 is located the lower front side of the LED, and generates reflected light L1 by reflecting part of light emitted downward from the LED upward. The reflected light L1 irradiates the upper part of the display at which the irradiation light of the LED does not sufficiently arrive due to shortening of the detection distance, and suppresses the generation of the undetectable area. A size and a position of the mirror 100 are appropriately adjusted so as to sufficiently irradiate an area that is likely to form the undetectable area for the reflected light L1.

Figure 4B:
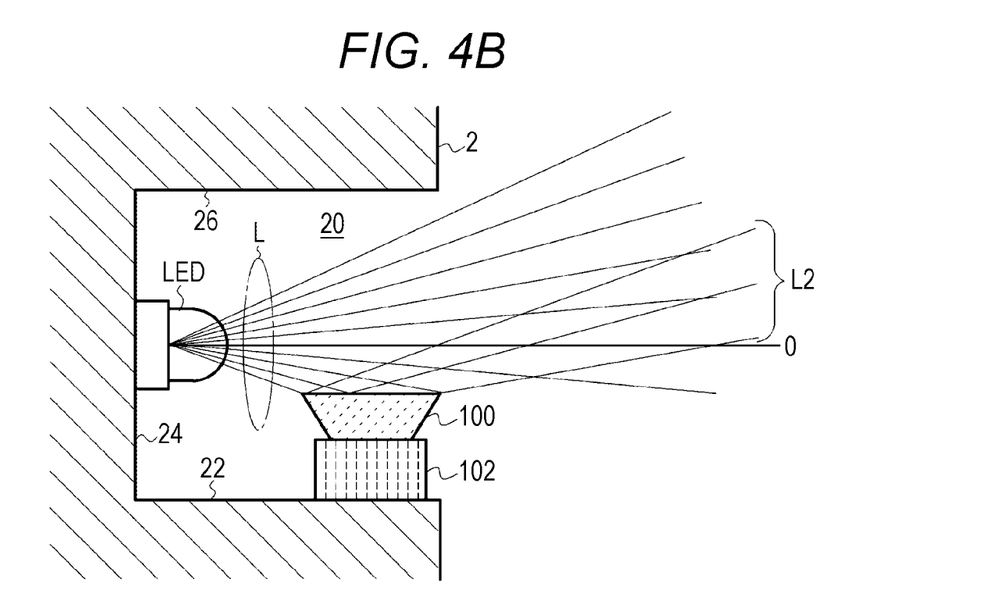

FIG. 4B illustrates an example in which a mounting position of the mirror 100 is set to be higher by one step toward the optical axis O. An offset member 102 having a certain height is attached to the bottom surface 22, and the mirror 100 is attached on the offset member 102. However, the offset member 102 is not essential, and the mirror 100 may have a thickness including a thickness of the offset member 102. When the mirror 100 is brought closer to the optical axis O, the mirror 100 can reflect intense light in the vicinity of the optical axis O and strengthen irradiation light L2 to the blind spot.

Figure 5A:
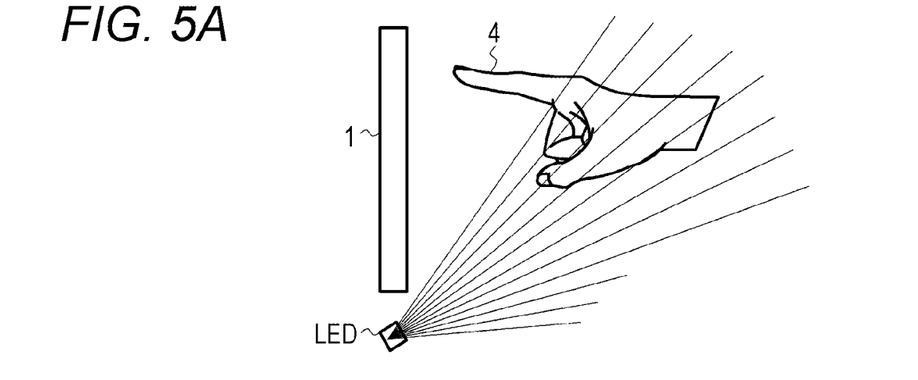
FIG. 5A illustrates an irradiation example when the mirror is not mounted.
Figure 5B:
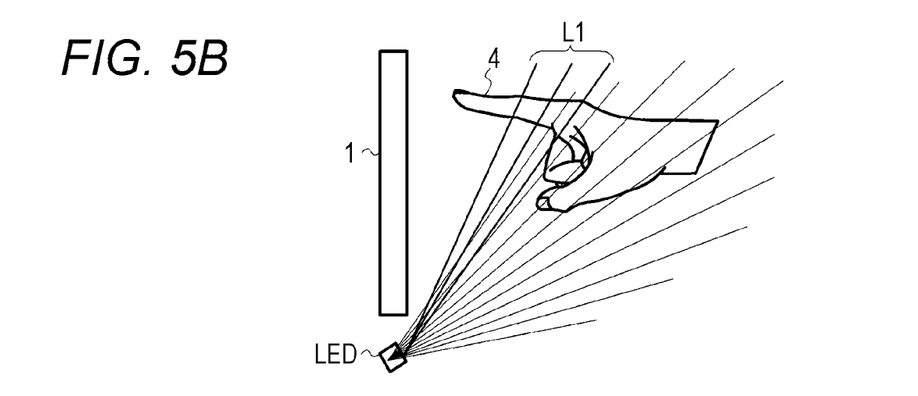
FIG. 5B illustrates an irradiation example when the mirror is mounted.
Figure 5C:
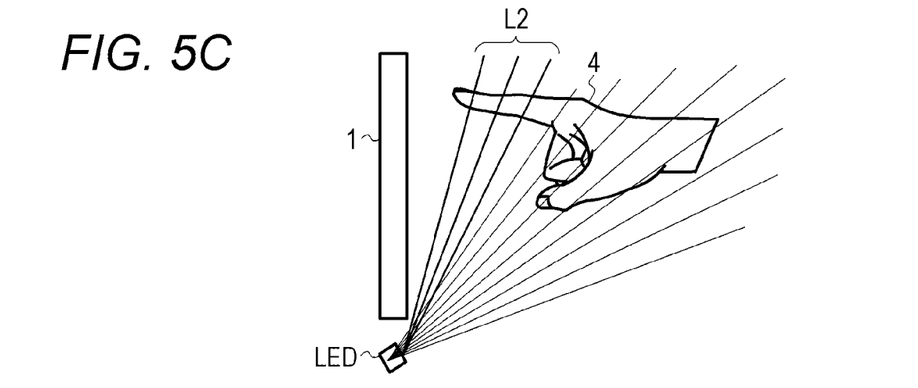
FIG. 5C illustrates an example of irradiation when a mounting position of the mirror is raised.

FIG. 5A illustrates an example of irradiation of an LED to which no mirror has been mounted, and illustrates that direct light from the LED alone is insufficient to irradiate the upper part of the display 1. FIG. 5B is an example of irradiation of the LED when the mirror 100 has been mounted as illustrated in FIG. 4A, and illustrates that the upper part of the display 1 is irradiated with the reflected light L1 of the mirror 100. FIG. 5C is an example of irradiation when the position of the mirror 100 is raised in the optical axis direction as illustrated in FIG. 4B, and illustrates that the reflected light L2 of the mirror 100 irradiates even a distal portion of a user's operation target 4 that operates the upper part of the display 1. In this manner, the mirror 100 improves the detection sensitivity in the area where the irradiation light is insufficient without causing deterioration in the detection sensitivity in a required detection range at the center or the lower part of the display 1.

Figure 6A:
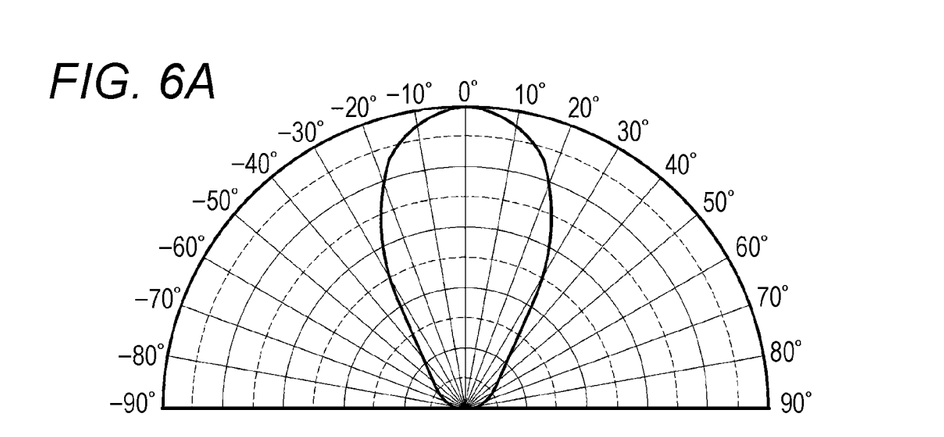
FIG. 6A illustrates light distribution characteristics of the LED.

FIG. 6A illustrates an example of light distribution characteristics of the LED. In general, light distribution characteristics of LEDs are strongest in the optical axis direction (0°) and become weaker as the distance from the optical axis increases. An angle at which the irradiation intensity is halved in the optical axis direction is referred to as a half-value angle. In the present embodiment, an LED having a half-value angle of 10° to 30° is used, and the mirror 100 reflects relatively strong irradiation light within the half-value angle.

Figure 6B:
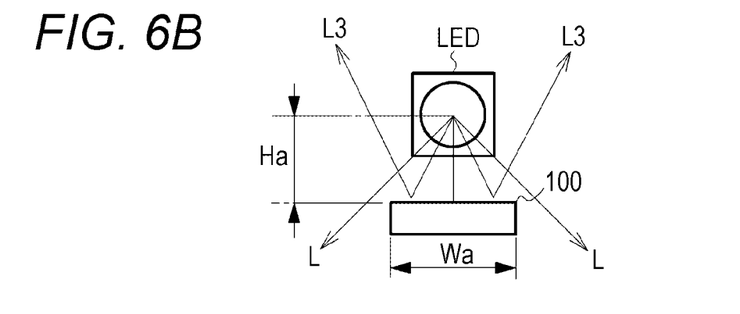
FIG. 6B is a view illustrating the positional relationship between the LED and the mirror when viewed from the front.

FIG. 6B illustrates the relative positional relationship between the LED and the mirror 100 when viewed from the front direction. A width of the mirror 100 is denoted by Wa, a distance between the optical axis O of the LED and the surface of the mirror 100 is denoted by Ha, and irradiation light at the half-value angle of the LED is denoted by L3. As the width Wa and the distance Ha are adjusted, the mirror 100 reflects the strong irradiation light within the half-value angle of the LED, and the irradiation can be enhanced by emitting reflected light L3 toward an area that is likely to form a blind spot where irradiation is insufficient. The distance Ha of the mirror 100 can be adjusted using the offset member 102 as illustrated in FIG. 4B.

Figure 7:
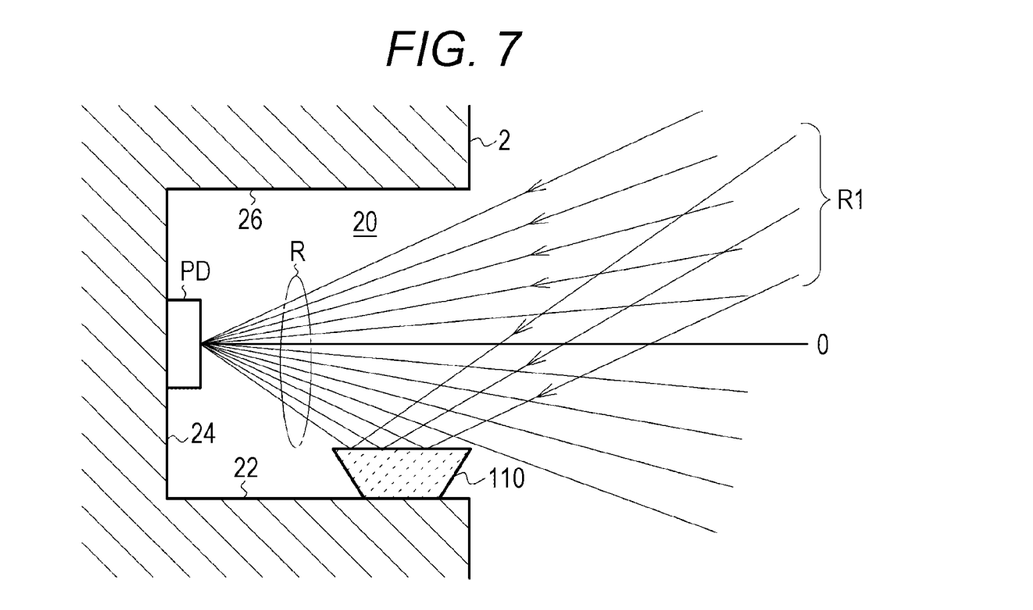
FIG. 7 is a schematic cross-sectional view illustrating a configuration of a light receiving unit of the proximity detection device according to the embodiment of the present invention.

FIG. 7 illustrates a schematic cross-sectional view of a light receiving unit including the light receiving element of the present embodiment. As illustrated in FIG. 7, a recess 20 similar to that of the light emitting element is formed in the accommodating member 2, a light receiving element PD is attached to the side surface 24 via a circuit board or the like, and a mirror 110 is attached to the bottom surface 22. The light receiving element PD receives the reflected light R reflected by the user's operation target 4 through an open surface (or light-transmissive cover) of the recess 20. In addition, the mirror 110 is located on the lower front side of the light receiving element PD such that the light receiving element PD receives a wide range of light. For example, the reflected light R1 is light reflected toward the light receiving element PD by the mirror 110, and indicates reflected light that is not received by the light receiving element PD without the mirror 110. Note that an optical axis O of the light receiving element PD is also illustrated horizontally here in order to facilitate understanding of the description, but, in practice, the optical axis O is set to an oblique direction with respect to the flat surface (display screen) of the display, similar to the optical axis of the LED.

Figure 8A:
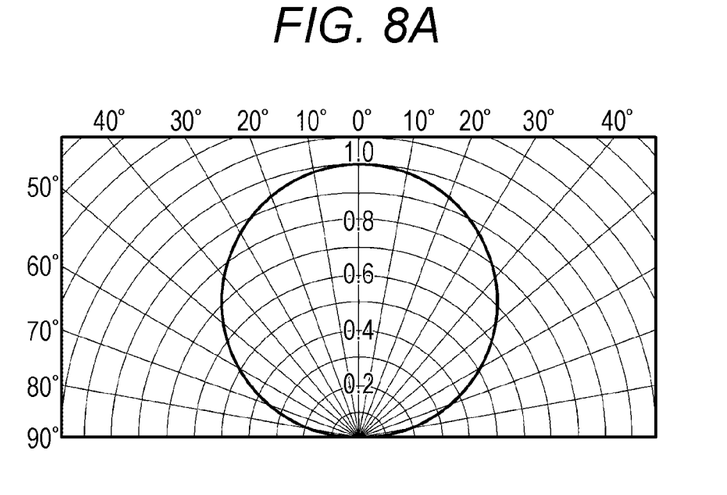
FIG. 8A illustrates light receiving characteristics of a light receiving element.

FIG. 8A illustrates an example of light receiving characteristics of the light receiving element PD. In general, a half-value angle of the light receiving characteristics of the light receiving element PD is wider than that of the LED, and thus, it is unnecessary to set a position of the mirror 110 to be high. Rather, it is effective to arrange a mirror having a wide reflecting surface at a low position so as to enable reception of reflected light in a wide range.

Figure 8B:
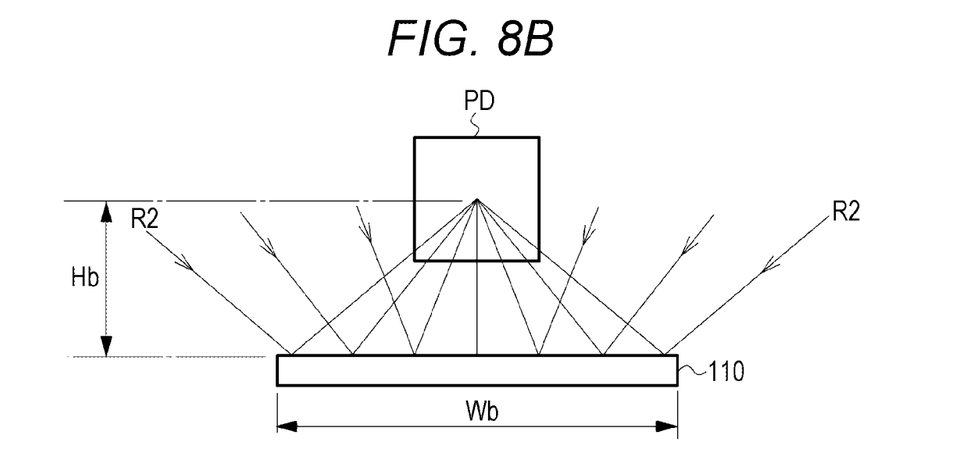
FIG. 8B is a view illustrating the positional relationship between the light receiving element and the mirror when viewed from the front.

FIG. 8B illustrates the relative positional relationship between the light receiving element PD and the mirror 110 when viewed from the front direction. A width of the mirror 110 is denoted by Wb, a distance between the optical axis O of the light receiving element PD and the surface of the mirror 110 is denoted by Hb, and reflected light at the half-value angle of the light receiving element PD is denoted by R2. As the width Wb and the distance Hb are adjusted, the mirror 110 receives strong reflected light within the half-value angle of the light receiving element PD, and the reflected light from the area that is likely to form the blind spot can also be effectively received. If the bottom surface of the recess accommodating the LED and a bottom surface of the recess accommodating the light receiving element PD have the same height, the distance Hb of the mirror 110 is larger than the distance Ha of the mirror 110. However, the configuration in which the heights of the bottom surfaces of the light emitting element and the light receiving element are the same is an example, and the present invention is not limited thereto.

Figure 9A:
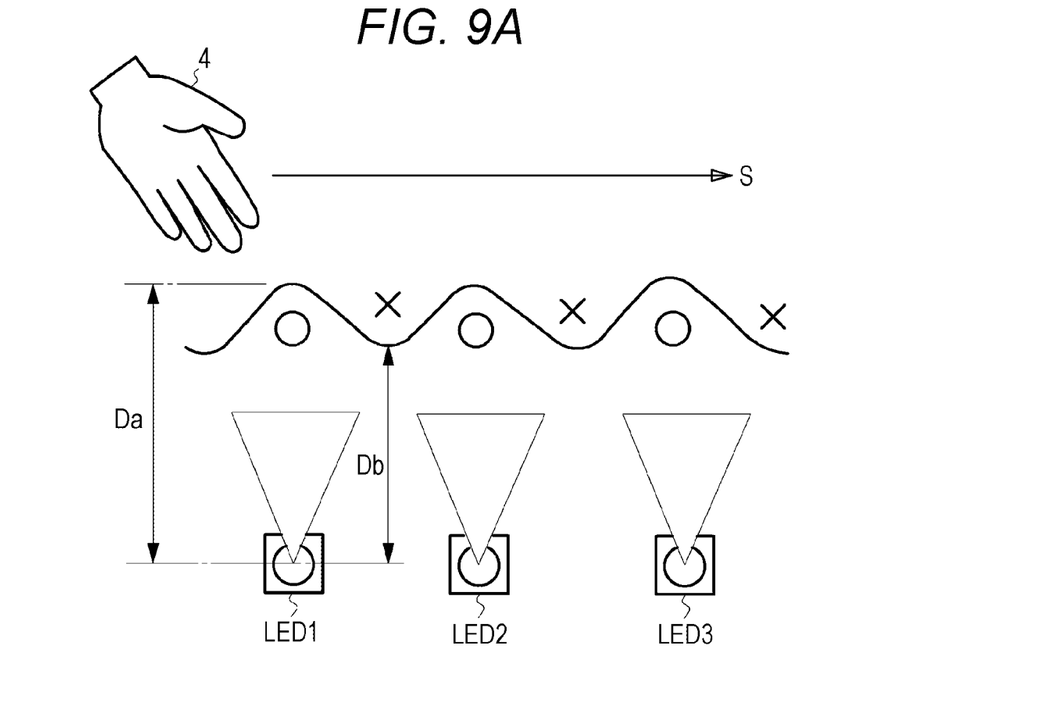
FIG. 9A is a view illustrating that the detection sensitivity differs depending on a position directly below the LED and a position between the LEDs.

In addition, the detection sensitivity is high directly above the LED due to the light distribution characteristics of the LED, and the irradiation intensity is weakener at a position of a gap between the LEDs so that the detection sensitivity is lower. Such a state is illustrated in FIG. 9A. The irradiation is strong near the optical axes of the LED 1, the LED 2, and the LED 3, and the detection sensitivity is good (○) up to a detection distance Da. At the position between the LEDs, however, the irradiation is weaker, and the detection sensitivity is good up to a detection distance Db (Db<Da), but the detection sensitivity becomes low (X) when exceeding the detection distance Db. For example, when the user's operation target 4 is swiped along an arrow S, there is a possibility that the detection may become unstable.

Figure 9B:
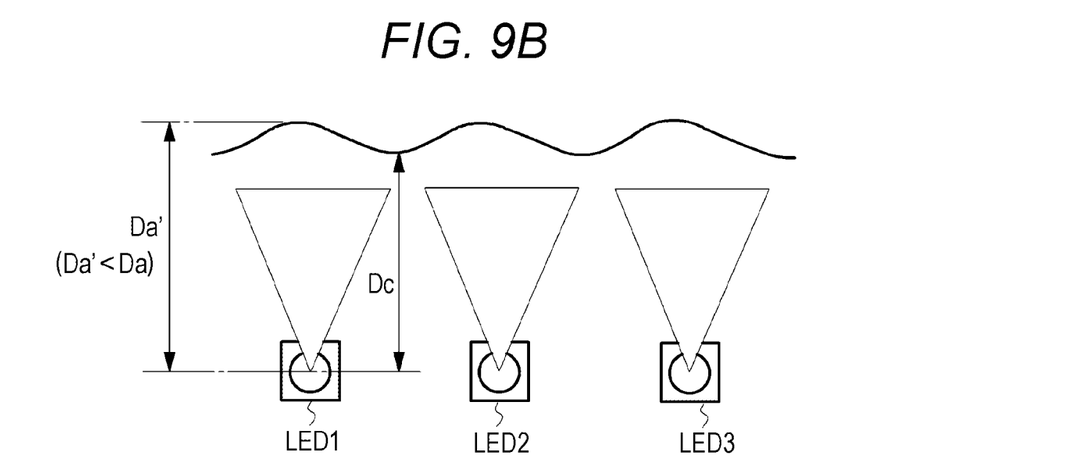
FIG. 9B is a view illustrating a method for compensating the detection sensitivity at the position between the LEDs.

Such non-uniformity of light distribution characteristics is particularly remarkable in a lower part of a detection range (lower part of the display) where the distance from the LED is short. Therefore, in order to compensate for the non-uniformity of the detection distances Da and Db, the width Wa of the mirror 100 arranged for the LED is narrowed such that light from the left and right sides to the bottom of the mirror 100 can escape in the present embodiment. As a result, irradiation light for detection is reduced by the mirror 100 in a direction directly below the LED, and a difference between a detection distance Da' (Da' is slightly shorter than Da: Da'<Da) and a detection distance Dc becomes smaller (the detection distance is equalized) as illustrated in FIG. 9B due to the light escaping from the left and right sides of the mirror 100 so that the detection sensitivity in the gap between the LEDs is compensated.

Figure 10A:
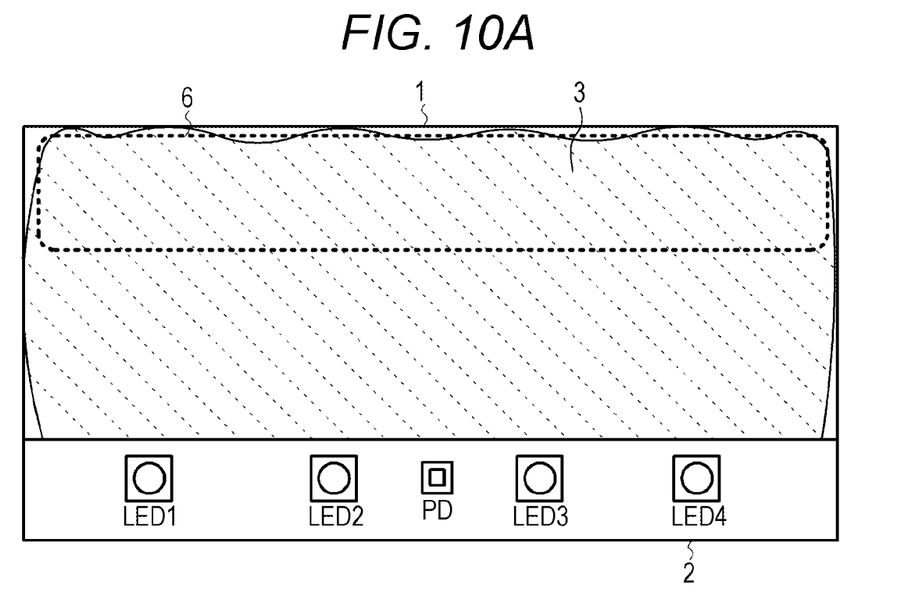
FIGS. 10A and 10B are views illustrating effects of the proximity detection device according to the embodiment of the present invention.
Figure 10B:
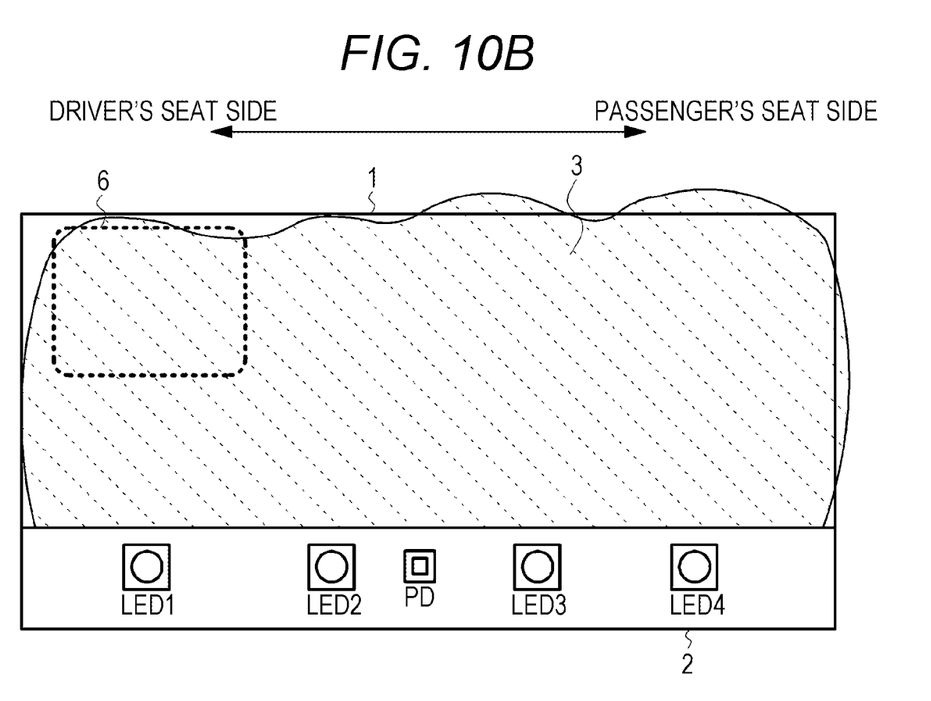

FIGS. 10A and 10B are views illustrating effects of the proximity detection device of the present embodiment, and correspond to FIGS. 3A and 3B, respectively. As described in FIG. 3A, the undetectable area 6 is generated in the upper part of the display 1 if the detection distances of the LEDs 1 to 4 are shortened for the purpose of preventing erroneous detection. In the present embodiment, the mirrors 100 mounted on the LEDs 1 to 4 irradiate the upper part of the display 1 which is likely to form the undetectable area 6, and the mirrors 110 mounted on the light receiving element PD receive a wide range of reflected light from the operation target as illustrated in FIG. 10A, and thus, the undetectable area 6 can be eliminated.

In addition, the undetectable area 6 is generated in the upper part of the display 1 on the driver's seat side by shortening the detection distances of the LED 1 and the LED 2 on the driver's seat side as described with reference to FIG. 3B. In the present embodiment, the mirror 100 mounted on at least the LED 1 irradiates the upper part of the display 1 on the driver's seat side which is likely to form the undetectable area 6, and the mirrors 110 mounted on the light receiving element PD receive a wide range of reflected light from the operation target as illustrated in FIG. 10B, and thus, the undetectable area 6 can be eliminated.

Typically, an optical system and a processing IC configured to detect the undetectable area are required in order to eliminate the undetectable area, that is, the blind spot, but the same level of performance can be achieved easily and at low cost by using an inexpensive mirror in the present embodiment.

Figure 11A:
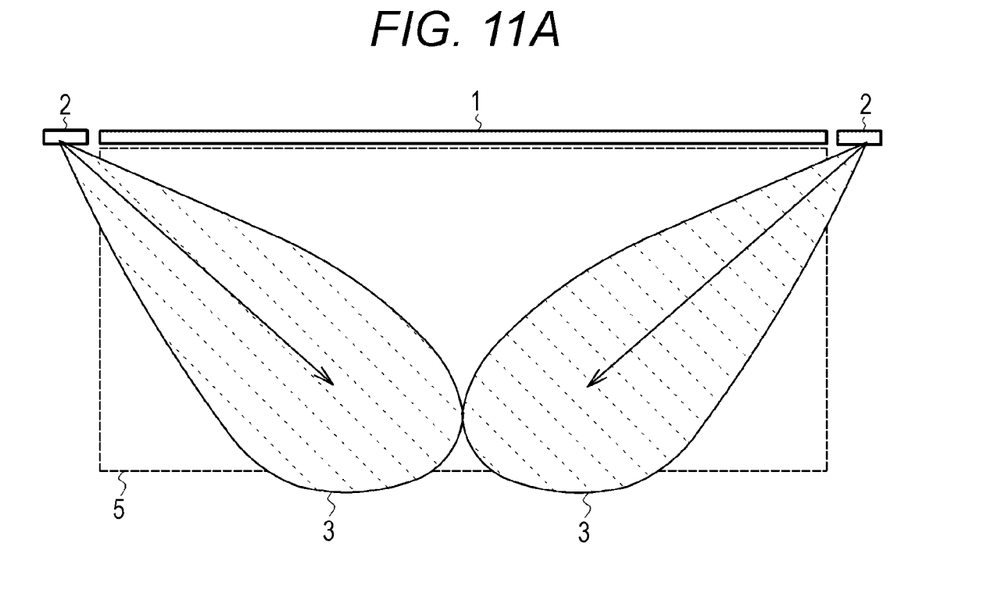
FIGS. 11A and 11B are views illustrating a proximity detection device according to another embodiment of the present invention.

Next, another embodiment of the present invention will be described. Although the light emitting unit and the light receiving unit are arranged in the lower part of the display 1 in the above-described embodiment, attachment positions of the light emitting part and the light receiving part for proximity detection are restricted by design requirements including a vehicle body, and it is not always possible to arrange the light emitting unit and the light receiving unit in the lower part of the display. In the present embodiment, the accommodating members 2 are attached to the left and right sides of the display 1, respectively, as illustrated in FIG. 11A, and a light emitting unit (an LED and a mirror) and a light receiving unit (a light receiving element and a mirror) are attached thereto.

Figure 11B:
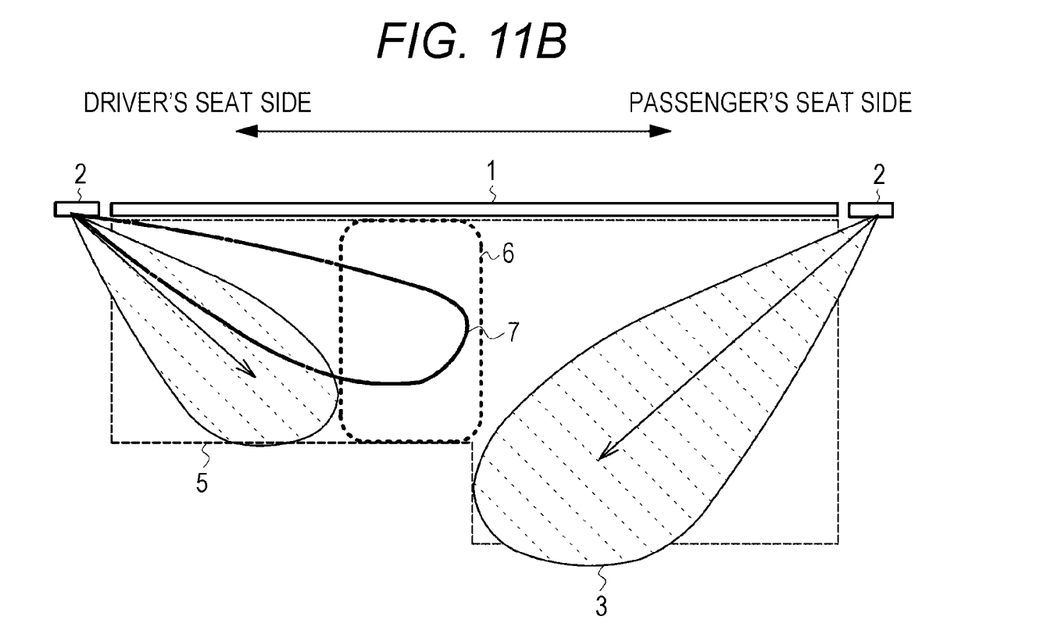

In such a configuration, when trying to shorten a detection distance on the driver's seat side, the detection distance of the LED on the driver's seat side (assuming a left-hand steering wheel vehicle in this example) is weakened (irradiation light is weakened) as illustrated in FIG. 11B. However, the irradiation light from the LED is emitted in the oblique direction in this example as well, and thus, an irradiation distance in the depth direction is shortened, and at the same time, an irradiation distance in the horizontal direction is also shortened. As a result, the undetectable area (blind spot) 6 is generated near the center of the display 1.

Even in the present embodiment, the vicinity of the center of the display 1, which is likely to form an undetectable area, is irradiated with reflected light 7 of the mirror 100 by arranging the mirror 100 on the lower front side of the LED as illustrated in FIG. 4A or 4B As a result, the detection sensitivity near the center of the display 1 is improved, and the undetectable area can be eliminated. It suffices that the mirrors 100 and 110 are applied to the LED and the light receiving element arranged on the driver's seat side, respectively, in the present embodiment, and it is unnecessary to mount a mirror for an LED and a light receiving element on the passenger's seat side.

Although four LEDs and one light receiving element are arranged in the lower part of the display in the above embodiment, the present invention is not limited to such a configuration. That is, the number of LEDs and the number of light receiving elements are arbitrary, and positions where the LEDs and light receiving elements are arranged are arbitrary. In addition, although the example in which the proximity detection device is attached to the display is illustrated in the above embodiment, the proximity detection device of the present invention may be attached to an electronic device other than the display. Further, the example in which the LED and the light receiving element are attached in the recess of the accommodating member is illustrated in the above embodiment, but this is merely an example, and any method of attaching the LED and the light receiving element is possible. In addition, a shape of the recess is not limited to the rectangular shape in which the bottom surface, the side surface, and the upper surface are orthogonal to each other, but may have a shape in which these surfaces intersect each other at an arbitrary angle, or may have a shape other than the rectangular shape. Further, flat plate mirrors are illustrated as the mirrors 100 and 110 in the above embodiment, but a concave mirror or a convex mirror may be used as long as the same effect can be obtained by collecting or diffusing the irradiation light of the LEDs.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A proximity detection device that detects proximity of an object using a light emitting element and a light receiving element that receives reflected light of irradiation light from the light emitting element that is reflected by the object, the proximity detection device comprising:
a first reflective member positioned near the light emitting element to reflect part of the irradiation light emitted from the light emitting element toward an area at which the irradiation light from the light emitting element does not sufficiently arrive; and
a second reflective member positioned near the light receiving element to enable reception of the reflected light from the light emitting element by the light receiving element in a wide range, in order to optically detect the proximity of the object.

2. The proximity detection device according to claim 1, wherein
the light emitting element is an LED, and
the first reflective member is positioned such that irradiation light within a certain angle from an optical axis of the light emitting element, which is part of the irradiation light directed to the first reflective member, is reflected.

3. The proximity detection device according to claim 2, wherein
the certain angle is a half-value angle.

4. The proximity detection device according to claim 1, wherein
the second reflective member is positioned such that reflected light within a certain angle from an optical axis of the light receiving element, which is part of the reflected light directed to the second reflective member, is received.

5. The proximity detection device according to claim 4, wherein
the certain angle is a half-value angle.

6. The proximity detection device according to claim 1, wherein
the light emitting element and the light receiving element are integrally attached to a periphery of an electronic device.

7. The proximity detection device according to claim 6, wherein
the electronic device is an in-vehicle display device.

8. The proximity detection device according to claim 1, wherein a plurality of light emitting elements are positioned near an electronic device in a vehicle, and each optical axis of the plurality of light emitting elements is oblique to the electronic device, and
a detection distance by a light emitting element on a driver's seat side of the electronic device is shorter than a detection distance by a light emitting element on a passenger's seat side, and the first reflective member is attached at least near the light emitting element on the driver's seat side.

9. The proximity detection device according to claim 8, wherein
the light emitting element and the light receiving element are attached in a lower part of the electronic device, the light emitting element emits light above the electronic device, and the first reflective member reflects part of the irradiation light of the light emitting element upward.

10. The proximity detection device according to claim 9, wherein
when a plurality of the light emitting elements are arranged in a left-right direction in the lower part of the electronic device, the first reflective member having a limited width is attached in a lower part of at least one of the light emitting elements.

11. The proximity detection device according to claim 8, wherein
the light emitting element and the light receiving element are attached to each of left and right sides of the electronic device, and the first and second reflective members are attached near the light emitting element and the light receiving element on at least one of the left and right sides.

12. The proximity detection device according to claim 1, further comprising an accommodating member configured to accommodate the light emitting element and the light receiving element and wherein
the accommodating member has a first space configured to accommodate the light emitting element and the first reflective member and a second space configured to accommodate the light receiving element and the second reflective member,
the light emitting element is attached to a first surface of the first space, and the first reflective member is attached to a second surface which forms a certain angle with the first surface, and
the light receiving element is attached to a third surface of the second space, and the second reflective member is attached to a fourth surface which forms a certain angle with the third surface.

13. The proximity detection device according to claim 12, wherein
the second surface and the fourth surface are arranged at approximately equal heights, and the first reflective member is attached at a higher position than the second reflective member when heights of the optical axis of the light emitting element and the optical axis of the light receiving element are approximately equal.

14. A proximity detection device in an in-vehicle display device that detects proximity of an object using at least one light emitting element and at least one light receiving element that receives reflected light of irradiation light from the at least one light emitting element that is reflected by the object, the proximity detection device comprising:

a first reflective member positioned near the at least one light emitting element to reflect part of the irradiation light emitted from the at least one light emitting element; and a second reflective member positioned near the at least one light receiving element to enable reception of light by the at least one light receiving element from the at least one light emitting element that is reflected by the object, in order to optically detect the proximity of the object.

15. The proximity detection device according to claim 14, wherein the light emitting element is an LED, and the first reflective member is positioned such that irradiation light within a certain angle from an optical axis of a light emitting element, which is part of the irradiation light directed to the first reflective member, is reflected.

16. The proximity detection device according to claim 15, wherein the certain angle is a half-value angle.

17. The proximity detection device according to claim 15, wherein the second reflective member is positioned such that reflected light within a certain angle from an optical axis of a light receiving element, which is part of the reflected light directed to the second reflective member, is received.

18. The proximity detection device according to claim 17, wherein the certain angle is a half-value angle.

19. The proximity detection device according to claim 14, wherein a plurality of light emitting elements are positioned near the in-vehicle display device, and each optical axis of the plurality of light emitting elements is oblique to the display device, and a detection distance by a light emitting element on a driver's seat side of the display device is shorter than a detection distance by a light emitting element on a passenger's seat side, and the first reflective member is positioned near the light emitting element on the driver's seat side.

20. The proximity detection device according to claim 14, wherein the at least one light emitting element and the at least one light receiving element are positioned near a lower part of the display device, the at least one light emitting element emits light above a surface of the display device, and the first reflective member reflects part of the irradiation light of the at least one light emitting element upward.

21. The proximity detection device according to claim 14, wherein the at least one light emitting element and the at least one light receiving element are positioned near each of left and right sides of the electronic device, and the first and second reflective members are positioned near the at least one light emitting element and the at least one light receiving element, respectively.

* * * * *